(12) United States Patent
Nashawaty et al.

(10) Patent No.: US 7,959,172 B2
(45) Date of Patent: Jun. 14, 2011

(54) PUSH-IN-BUNG ASSEMBLY AND SUSPENSION SYSTEM USING SAME

(76) Inventors: Michael Nashawaty, Taunton, MA (US); Stephen Nashawaty, Lakeville, MA (US)

( * ) Notice: Subject to any disclaimer, the term of this patent is extended or adjusted under 35 U.S.C. 154(b) by 161 days.

(21) Appl. No.: 12/423,476

(22) Filed: Apr. 14, 2009

(65) Prior Publication Data

US 2009/0273153 A1 Nov. 5, 2009

Related U.S. Application Data

(60) Provisional application No. 61/126,188, filed on May 2, 2008.

(51) Int. Cl.
*B60G 9/02* (2006.01)

(52) U.S. Cl. ......... 280/124.156; 280/124.1; 280/124.11; 180/352; 180/378; 403/79; 74/579 R

(58) Field of Classification Search ........... 280/124.156, 280/124.1, 124.11, 124.13, 139; 180/349, 180/352, 377, 378; 301/135; 403/167, 76, 403/79, 150, 154, 159; 74/579 R See application file for complete search history.

(56) References Cited

U.S. PATENT DOCUMENTS

| | | | | |
|---|---|---|---|---|
| 1,196,524 A | * | 8/1916 | Cluett | 74/579 R |
| 1,346,326 A | * | 7/1920 | McKinley | 280/124.1 |
| 1,781,474 A | * | 11/1930 | Pierson | 74/591 |
| 2,732,903 A | * | 1/1956 | Chayne | 180/352 |
| 4,804,205 A | * | 2/1989 | Parsons | 280/686 |
| 5,242,238 A | * | 9/1993 | Warner et al. | 403/154 |
| 5,564,521 A | * | 10/1996 | McLaughlin et al. | 180/352 |
| 2004/0217527 A1 | * | 11/2004 | Ebner et al. | 266/252 |
| 2004/0258460 A1 | * | 12/2004 | Taylor | 403/79 |
| 2006/0017256 A1 | * | 1/2006 | Hupperich | 280/124.156 |
| 2008/0240848 A1 | * | 10/2008 | Rauschert et al. | 403/122 |

* cited by examiner

*Primary Examiner* — Ruth Ilan
(74) *Attorney, Agent, or Firm* — Mills & Onello, LLP; David M. Mello

(57) ABSTRACT

A push-in-bung assembly is provided that improves vibration and lateral movement control for vehicle suspension systems. The push-in-bung assembly includes a bung formed of rigid material and having a first end configured to connect to a vehicle frame and a second end configured to connect to a vehicle differential. A track bar can be included between the bung and the vehicle frame. The track bar can connect with the vehicle frame using a bracket assembly.

20 Claims, 3 Drawing Sheets

PUSH-IN-BUNG ASSEMBLY AND SUSPENSION SYSTEM USING SAME

CROSS REFERENCE TO RELATED APPLICATION

This application claims the benefit of priority under 35 U.S.C. §119(e) from co-pending, commonly owned U.S. provisional patent application Ser. No. 61/126,188, entitled Track Bar Assembly, filed May 2, 2008.

FIELD OF THE INVENTION

The present invention relates generally to suspension systems. Particularly, the present invention relates systems and methods used in reducing lateral motion in coil spring, solid axle systems.

BACKGROUND OF THE INVENTION

Among other things, suspension systems support mobile portions of vehicles, including wheel assembles or suspension systems. Part of the purpose of a suspension system is to dampen both lateral movement and vertical shock. Generally, suspension systems provide support, proper wheel alignment, control for dampening normal bounce, and control for road shock induced when vehicles encounter road pits, pot holes, or other sudden shocks. Some mobile vehicles, such as autos, trucks, or others, use a suspension system design known in the art as a solid axle with coil spring.

Parts for a solid axle with coil spring suspension system include: a track bar of either fixed or adjustable length, an axle tube, a set of one or more arms for locating the front to back position of the differential on four wheel drive vehicles, either two coil springs or coil/over struts for suspending the vehicle frame above an axle or differential, and two shock absorbers or struts to control vertical dampening.

For cars or trucks with modified suspensions such as trucks with raised ride heights, the track bar may include a hiem end for varying the length of the track bar. By varying the length of the track bar, the lateral wheel position may be adjusted allowing for aligning both front and back set(s) of wheels.

One method of attaching a track bar with a vehicular differential uses a ball and socket type of joint. Ball and socket joints, by design, allow significant lateral movement. Under certain shock conditions, not dampening this lateral shock may result in violent side to side oscillation or wheel shimmy. Undampened lateral movement may results in unsafe condition affecting the safe control of the vehicle. The vehicle must be slowed significantly to stop this unsafe lateral movement.

In another type of connection, the track bar may connect with the vehicle differential using a bushing. Bushing joints, also by nature, provide minimal dampening of lateral movement. Again, this may result in a dangerous axle shimmy. Again, the vehicle must significantly reduce speed in order to control the excessive lateral movement.

SUMMARY OF THE INVENTION

According to one aspect of the present invention, provided is a push-in-bung assembly that includes a bung formed of rigid material and having a first end configured to connect to a vehicle frame and a second end configured to connect to a vehicle differential.

The push-in-bung assembly can also include a plate configured to secure the bung to the vehicle differential.

The push-in-bung assembly can further include a threaded bolt and nut assembly that connects the plate with the bung.

The push-in-bung assembly can further include a track bar having a first end and a second end, wherein the first end of the track bar connects with the first end of the bung.

The first end of the bung can have an opening formed therein configured to receive the first end of the track bar.

The first end of the track bar can be secured in the first end of the bung in a manner that allows rotational movement of the first end of the track bar with respect to the bung but not lateral movement.

The second end of the track bar can connect to the vehicle frame.

The track bar can be hollow.

The track bar can be perforated along a length of the track bar.

The first end of the track bar can includes a first hiem end.

The second end of the track bar can include a second hiem end.

The push-in-bung assembly can further include a bracket assembly that connects to the second end of the track bar and is configured to also connect to the vehicle frame.

The second end of the track bar can be secured in the bracket assembly in a manner that allows rotational movement of the second end of the track bar with respect to the bracket assembly but not lateral movement.

The first end of the bung can have at least one substantially vertical wall having at least one opening formed therein.

In accordance with another aspect of the invention, provided is a push-in-bung assembly, which includes a bung formed of rigid material and having a first end and a second end, the bung second end configured to connect to a vehicle differential; a track bar having a first end and a second end, wherein the track bar first end connects to the bung first end; and a bracket assembly that connects to the second end of the track bar and is also configured to connect to a vehicle frame.

The push-in-bung assembly can further include a plate configured to secure the bung to the vehicle differential.

The first end of the bung can have an opening formed therein configured to receive the first end of the track bar.

The first end of the track bar can be secured in the first end of the bung in a manner that allows rotational movement of the first end of the track bar with respect to the bung but not lateral movement.

The second end of the track bar can be secured in the bracket assembly in a manner that allows rotational movement of the second end of the track bar with respect to the bracket assembly but not lateral movement.

In accordance with yet another aspect of the invention, provided is a push-in-bung assembly that includes a bung formed of rigid material and having a first end and a second end, the bung second end configured to connect to a vehicle differential; a track bar having a first end and a second end, wherein the track bar first end connects to the bung first end, wherein the first end of the track bar is secured in the first end of the bung in a manner that allows rotational movement of the first end of the track bar with respect to the bung but not lateral movement; and a bracket assembly that connects to the second end of the track bar and is also configured to connect to a vehicle frame, wherein the second end of the track bar is secured in the bracket assembly in a manner that allows rotational movement of the second end of the track bar with respect to the bracket assembly but not lateral movement.

DETAILED DESCRIPTION OF THE PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

The present invention relates to a device that provides improved vibration and lateral movement control for vehicle suspension systems. In the illustrative embodiment provided herein, the device is referred to as a "push-in-bung assembly," which includes a relatively rigid bung-shaped connector, referred to herein as a "bung," configured to connect a track bar (or the like) to a vehicle." The push-in-bung assembly can form part of a vehicle suspension system or assembly.

Figure 1:
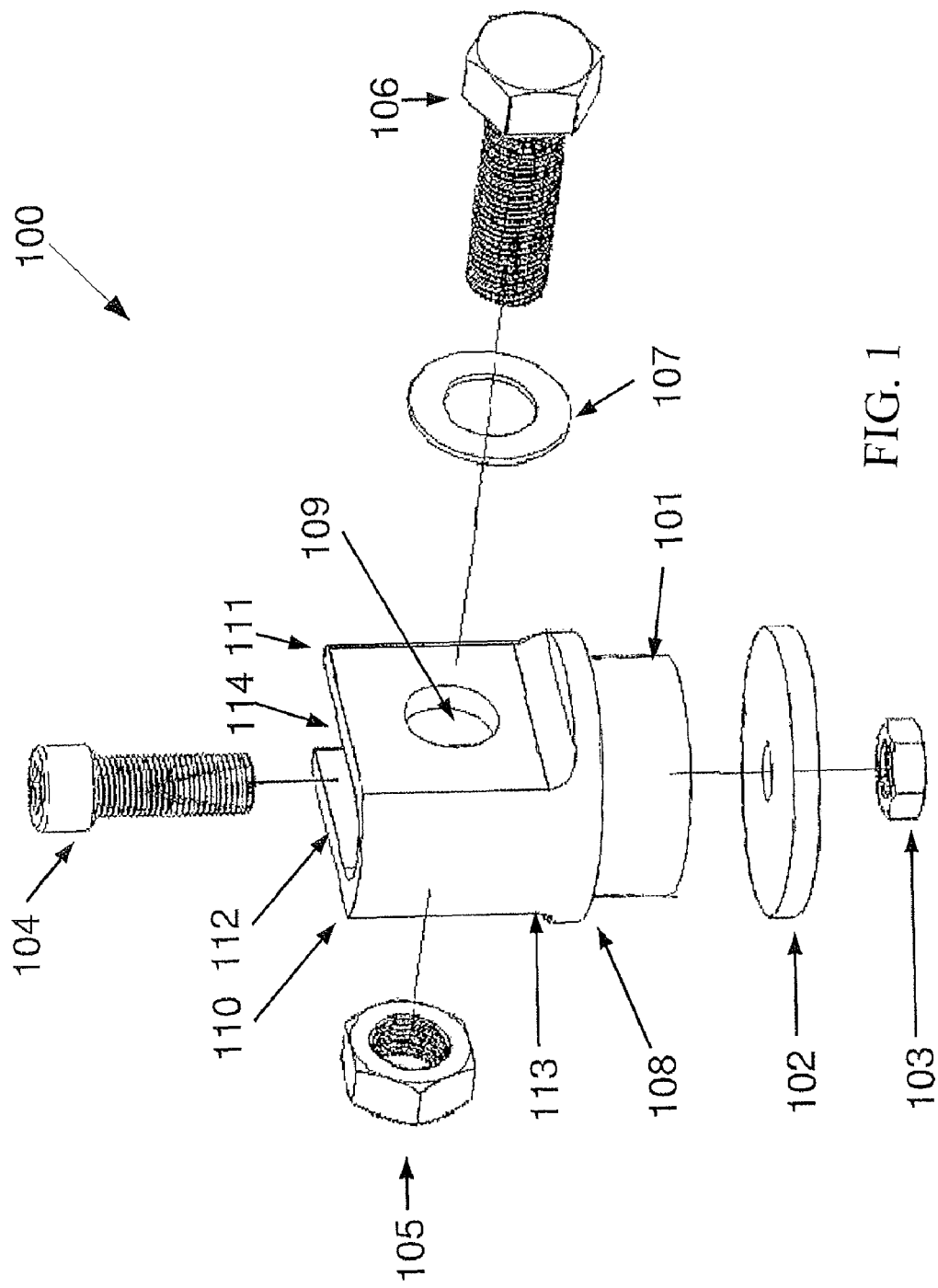
FIG. 1 is a perspective view of one embodiment of a push-in-bung assembly in accordance with the present invention.

An embodiment of a push-in-bung assembly 100 in accordance with aspects of the present invention is illustrated in FIG. 1. The push-in-bung assembly 100 includes a bung 108. One end of the bung can connect with a vehicle differential, while the other end of the bung assembly can connect with a vehicle track bar. In this embodiment, the push-in-bung assembly 100 is configured to retrofit a Ford F250-550 Super Duty pickup truck of model year 2005 or later. Other embodiments can be formed for other vehicles, as will be appreciated by those skilled in the art. The present invention is, therefore, not limited to push-in-bung assemblies for use with this particular make and model of vehicle.

The push-in-bung assembly 100 includes a bung 108, a plate 102, a bolt 104, a nut 103, a second nut 105, a second bolt 106, and a washer 107. In this embodiment, a first end 110 of the bung 108 comprises two walls 111, 112 and an opening 109 formed in each wall 111, 112. Openings 109 are of sufficient size and alignment to enable the bolt 106 to penetrate and pass through.

Figure 2:
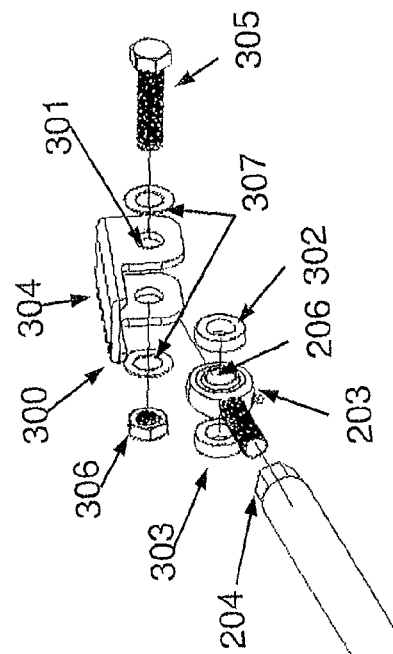
FIG. 2 is an exploded perspective view of another embodiment of a push-in-bung assembly, also in accordance with the present invention.
Figure 2:
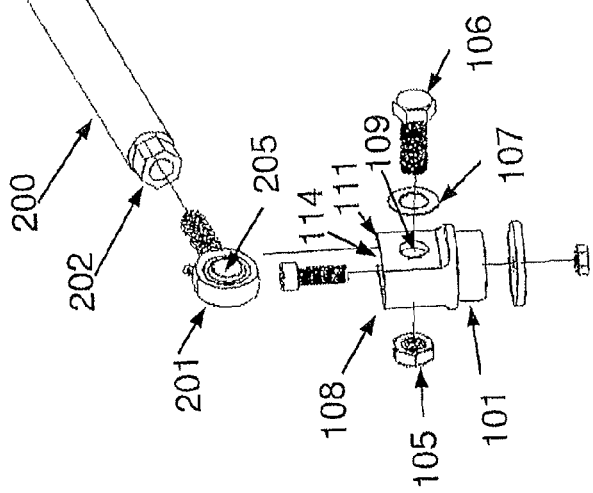

In addition, in this embodiment, the two walls 111, 112 are connected together on one side by a third wall 113. An opening 114 is formed between the two walls 111, 112, which is of sufficient size for the insertion of one end of a track bar 200, as shown in FIG. 2. The bung 108 may be made of any material of sufficient strength for use in an auto, truck, or other types of vehicle suspension system. For example, the bung can be made of steel, or other metal.

Although in this embodiment, first end 110 of the bung 108 is formed to include two walls 111, 112 with openings 109, other embodiments may include one or more walls with or without openings. That is, other wall, hole, and opening arrangements may be used with other vehicles, as an example. Also, in other embodiments, the walls may be directed vertically with respect to a lower portion of the bung, slanted, or of other directions.

FIG. 2 is an exploded perspective view of a push-in-bung assembly 150 that includes the push-in-bung assembly 100 of FIG. 1 and a track bar 200. In this embodiment, track bar 200 inserts between the two walls 111, 112 of first end 110 of bung 108. Bolt 106 penetrates through the openings 109 and fastens with nut 105. In this fashion, the track bar 200 connects with the bung 108. In other embodiments, the bolt 106 and nut 105 may be replaced with pins or by other types of connectors. It should be noted that in the example embodiment, which relates to a 2005 or later Ford F250-F550 4×4 Super Duty pickup truck, the track bar has a bend to accommodate a stock 4" lift, which is not shown in FIGS. 2 and 3.

In this embodiment, plate 102 is used to hold together the second end 101 of the bung 108 and a vehicle differential (not shown). Plate 102 is of sufficient size and strength to structurally provide this function. The precise requirements for such size and strength can vary by vehicle, as will be appreciated by those skilled in the art. Although this embodiment includes plate 102, in other embodiments the push-in-bung assembly 100 need not include plate 102 or the nut 103 and bolt 104 combination.

The track bar 200 can include two hiem ends 201, 203. Hiem end 201 can be threaded and attach to a correspondingly threaded extension 202 of the track bar 200. Similarly, hiem end 203 can be threaded and attach to a correspondingly threaded extension 204 of the track bar 200. Those skilled in the art will appreciate that instead of hiem ends (or joints), bushings could be used in other embodiments.

In this embodiment, the hiem end 201 inserts into the opening 114 formed by walls 111, 112 of the bung 108. Bolt 106 inserts through the opening 109, and through an opening 205 in the hiem end 201. Bolt 106 is secured in place using nut 105. Washer 107 fits between the wall 111 and the bolt 106. Track bar 200 may be made of any material having sufficient strength for use in auto, truck or other suspension systems including metal, plastic, or other material. Such materials are known in the art.

In yet another embodiment, the hiem ends 201, 203 can be welded to the ends 202, 204 of track bar 200. The connection of hiem end 201 to the first end 110 of the bung 108 can be the same as described above.

The push-in-bung assembly 150 can include a bracket assembly 300 that connects with hiem end 203. In this embodiment, the bracket assembly 300 includes a bracket 304, two spacers 302, 303, a bolt 305, a nut 306, and two washers 307. The two spacers 302, 303 are positioned on opposite sides of opening 206 in the hiem end 204. The bracket 304 is positioned over the spacers 302, 303 with an opening 301 aligning with openings in the spacers and hiem end 203. A bolt 305 inserts through washers 307, the opening 206 in the hiem end 206 and the openings in the spacer 302, 303. A nut 306 secures the bolt 305 in place.

In another bracket embodiment, the bracket assembly 300 may be directly attached to the track bar 200 by welding or other means.

Figure 3:
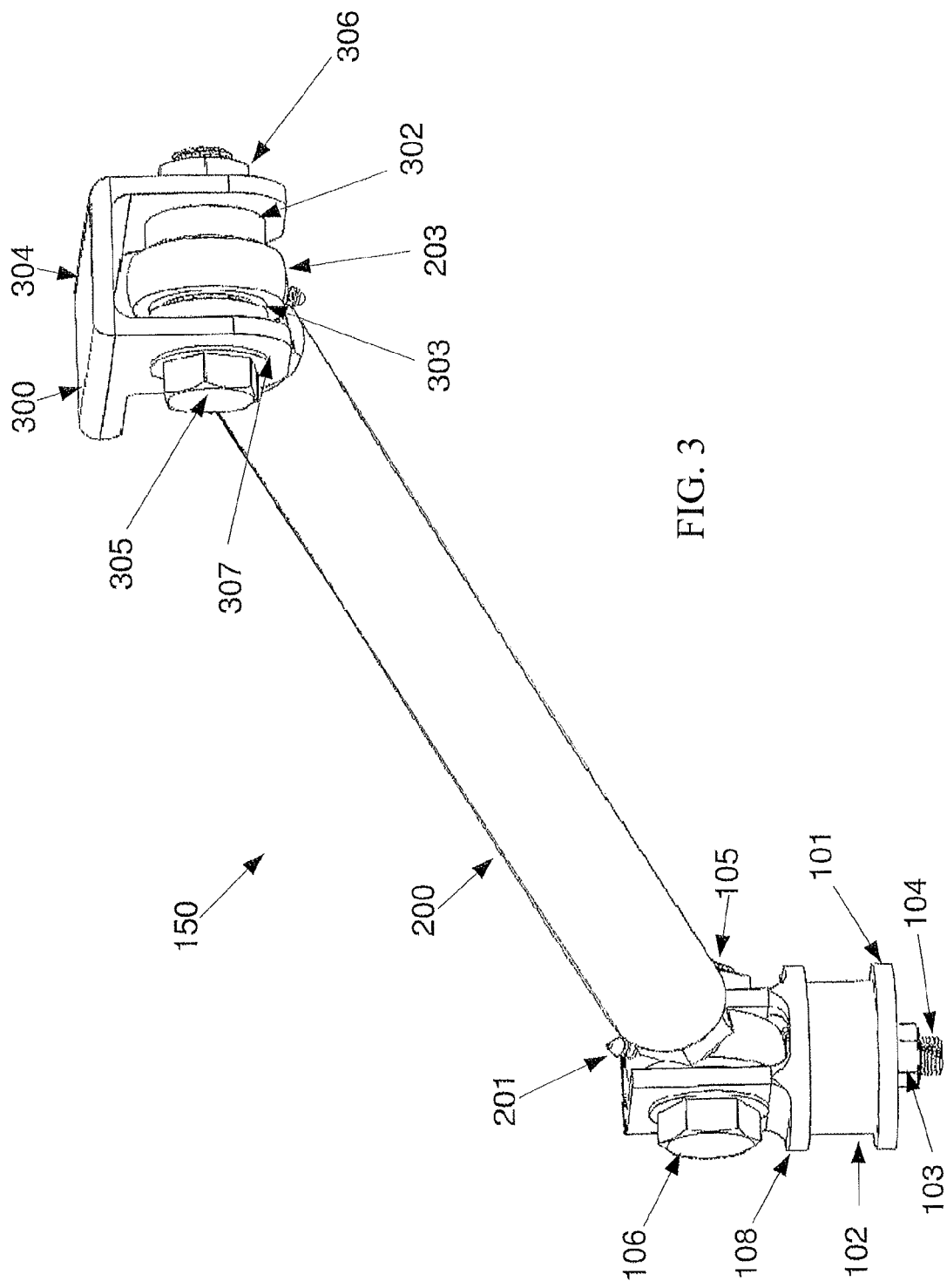
FIG. 3 is perspective view of the push-in-bung assembly of FIG. 2 in assembled form.

FIG. 3 is perspective view of the push-in-bung assembly 150 of FIG. 2 in assembled form. In FIG. 3, the bung 108 is connected with the track bar 200 using nut 105 and bolt 106 inserted through hiem end 201. FIG. 3, also illustrates plate 102 attached to the bung 108 using nut 103 and bolt 104.

Also, FIG. 3 illustrates the attachment between the track bar 200 and the bracket assembly 300. The bracket assembly 300 connects with the track bar 200 by inserting bolt 305 through the openings in the bracket 304, two spacers 302, 303, and the second hiem end 204. Nut 306 secures bolt 305 to the bracket assembly 300. Also, shown for reference is a washer 307.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A push-in-bung assembly that provides vibration and lateral movement control for a vehicle suspension system, the push-in-bung assembly comprising:
   a substantially cylindrical bung formed of rigid material and including:
      a first end configured to house a first hiem end of a track bar, wherein the first hiem end of the track bar is secured in the first end of the bung in a manner that allows rotational movement of the first hiem end of the track bar with respect to the bung but not lateral movement, the bung first end configured to connect to a vehicle frame via the track bar; and
      a second end, wherein the bung is configured to receive a bolt that connects the bung second end to a vehicle differential via a ring-shaped plate.

2. The push-in-bung assembly of claim 1, wherein the ring-shaped plate includes an opening configured to receive the bolt to secure the bung directly to the vehicle differential with a nut.

3. The push-in-bung assembly of claim 1, wherein the first end of the bung has a plurality of walls defining an opening configured to receive the first hiem end of the track bar.

4. The push-in-bung assembly of claim 3, wherein the plurality of walls includes at least two openings formed therein that are configured to receive a second bolt that passes through an opening defined in the first hiem end.

5. The push-in-bung assembly of claim 1, wherein the track bar includes a second end configured to connect to the vehicle frame.

6. The push-in-bung assembly of claim 5, wherein the second end of the track bar includes a second hiem end.

7. The push-in-bung assembly of claim 5, further comprising:
   a bracket assembly that connects to the second end of the track bar and is configured to also connect directly to the vehicle frame.

8. The push-in-bung assembly of claim 7, wherein the second end of the track bar is secured in the bracket assembly in a manner that allows rotational movement of the second end of the track bar with respect to the bracket assembly but not lateral movement.

9. The push-in-bung assembly of claim 1, wherein the track bar is hollow.

10. The push-in-bung assembly of claim 1, wherein the track bar is perforated along a length of the track bar.

11. The push-in-bung assembly of claim 1, wherein the vehicle is a 4×4 vehicle.

12. The push-in-bung assembly of claim 1, wherein the vehicle is a 4×2 vehicle.

13. A push-in-bung assembly that provides vibration and lateral movement control for a vehicle suspension system, the push-in-bung assembly comprising:
   a substantially cylindrical bung formed of rigid material and having a first end and a second end;
   a ring-shaped plate configured to directly connect the bung second end to the vehicle differential;
   a track bar having a first end and a second end, wherein the track bar first end connects to the bung first end; and
   a bracket assembly that connects to the second end of the track bar and is also configured to connect directly to a vehicle frame,
   wherein the first end of the track bar is secured in the first end of the bung in a manner that allows rotational movement of the first hiem end of the track bar with respect to the bung but not lateral movement, and
   wherein the bung is configured to receive a bolt that connects the bung second end to a vehicle differential via the ring-shaped plate.

14. The push-in-bung assembly of claim 13, wherein the ring-shaped plate includes an opening configured to receive the bolt to secure the bung directly to the vehicle differential with a nut.

15. The push-in-bung assembly of claim 13, wherein the first end of the bung has a plurality of walls defining an opening configured to receive the first hiem end of the track bar.

16. The push-in-bung assembly of claim 13, wherein the second end of the track bar is secured in the bracket assembly in a manner that allows rotational movement of the second end of the track bar with respect to the bracket assembly but not lateral movement.

17. The push-in-bung assembly of claim 13, wherein the vehicle is a 4×4 vehicle.

18. The push-in-bung assembly of claim 13, wherein the vehicle is a 4×2 vehicle.

19. A push-in-bung assembly that provides vibration and lateral movement control for a vehicle suspension system, the push-in-bung assembly comprising:
   a substantially cylindrical bung formed of rigid material and having a first end and a second end, the bung second end configured to connect to a vehicle differential;
   a ring-shaped plate configured to directly connect the bung second end to the vehicle differential;
   a bolt that passes through an opening in the ring-shaped plate to secure the bung to the vehicle differential with a nut;
   a track bar having a first end and a second end, wherein the track bar first end connects to the bung first end, wherein the first end of the track bar is secured in the first end of the bung in a manner that allows rotational movement of the first end of the track bar with respect to the bung but not lateral movement; and
   a bracket assembly that connects to the second end of the track bar and is also configured to connect to a vehicle frame, wherein the second end of the track bar is secured in the bracket assembly in a manner that allows rotational movement of the second end of the track bar with respect to the bracket assembly but not lateral movement.

20. The push-in-bung assembly of claim 19, wherein the vehicle is a 4×2 vehicle.

* * * * *